United States Patent [19]
Burns et al.

[11] 3,848,960
[45] Nov. 19, 1974

[54] JEWELLED STABILIZED OPTIC CELL

[75] Inventors: Richard H. Burns, Webster; Orest Engelbrecht, Brighton; Brian H. Welham, Perinton, all of N.Y.

[73] Assignee: Bausch & Lomb Incorporated, Rochester, N.Y.

[22] Filed: Mar. 30, 1973

[21] Appl. No.: 346,498

[52] U.S. Cl. .................................. 350/16, 350/310
[51] Int. Cl. ........................................ G02b 23/16
[58] Field of Search ...... 350/16, 310; 356/148, 149, 356/248, 250

[56] References Cited
UNITED STATES PATENTS

| | | |
|---|---|---|
| 2,944,783 | 7/1960 | Macleish et al.................. 350/16 X |
| 3,409,350 | 11/1968 | Call................................. 350/16 X |
| 3,460,881 | 8/1969 | Heflinger ............................. 350/16 |
| 3,532,409 | 10/1970 | Humphrey............................ 350/16 |

*Primary Examiner*—David H. Rubin
*Attorney, Agent, or Firm*—Frank C. Parker; Harry C. Post

[57] ABSTRACT

An assembly for mounting an optical stabilizing mechanism in a hydrostatic stabilizer cell utilizing a coiled spring attached to the optical member and to a mounting means assembly extending from a wall of the cell. The coil spring is positioned under tension and the optical member is pivotally engaged to the mounting means assembly.

3 Claims, 1 Drawing Figure

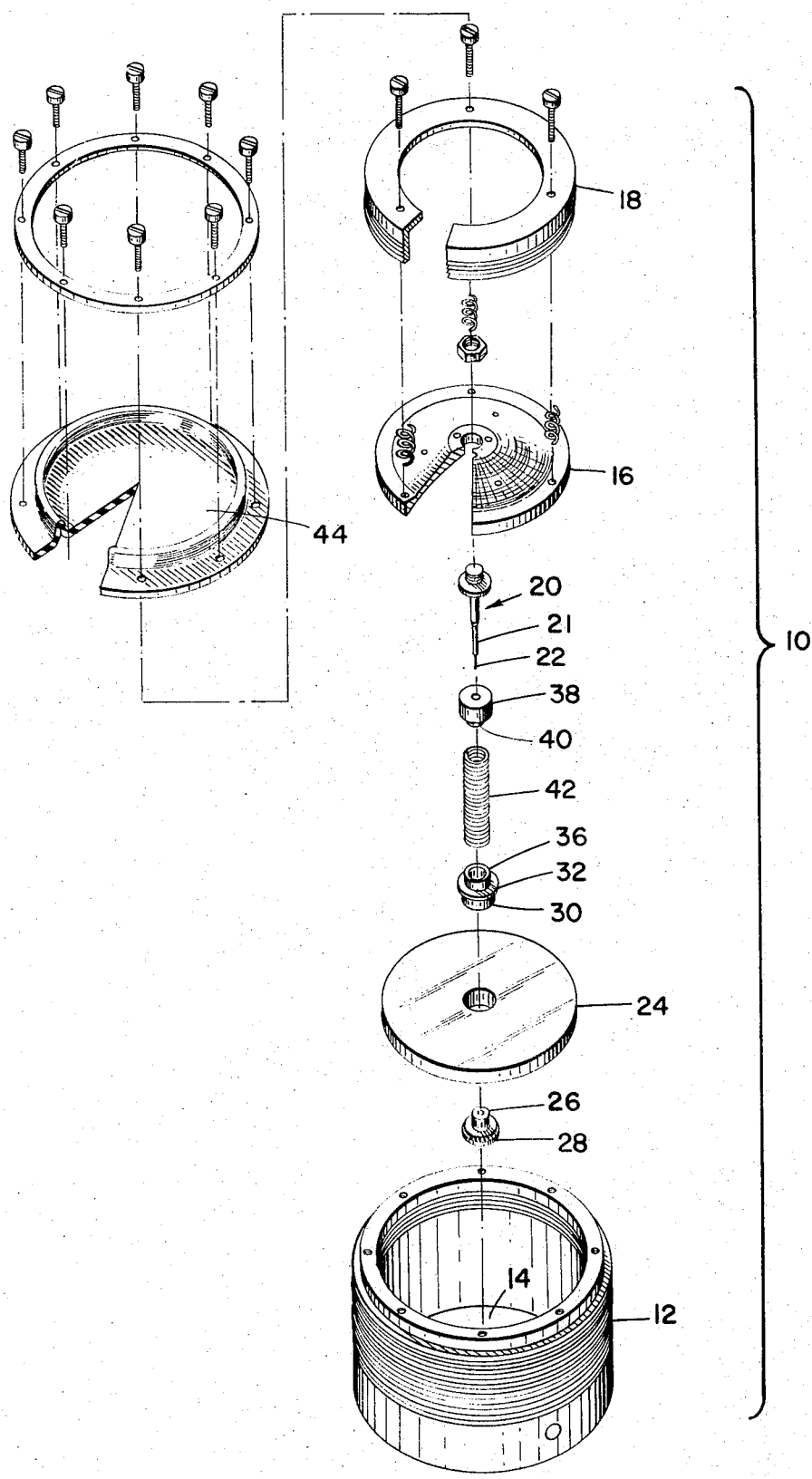

JEWELLED STABILIZED OPTIC CELL

BACKGROUND OF THE INVENTION

1. Field of the Invention

The invention lies in the field of optical mounting mechanisms and more particularly in the field of pivotal mounts for optical members immersed in fluids.

It is especially concerned with mounting assemblies used in systems which stabilize optical devices against small anagle deviations thereof from a desired line of sight.

2. Description of the Prior Art

It has long been recognized that the motion of uncompensated optical devices produces a movement of the focused image seriously degrading the viewing or photography of same. This degradation becomes increasingly apparent with increased magnification because optical magnifying systems not only magnify the image viewed but also magnify relative motion thereof. There are several systems which may be used to compensate for unwanted motion. For example, if the instrument is mounted on a platform, the platform may be isolated from the motion, if hand held, an inertially stabilized unit may be used to isolate the optical train from the motion. This latter device can be utilized in optical instruments mounted on moving or vibrating platforms such as tanks, aircraft, marine vessels and the like. Such stabilization means are adapted to filter out high frequency angular motions of small amplitude while at the same time passing or transmitting low frequency angular motion of large amplitude occurring when the instrument is panned.

One method of stabilizing an optical train, in a telescope for example, is to place an optical member such as a mirror in the optical imaging train between the occular lens system and the objective lens system. The optical member is immersed and buoyantly supported in a chamber filled with transparent fluid. The optical member is coupled by the fluid to the walls of the chamber and will undergo a proportional movement with reference to inertial space when the chamber is moved with reference to inertial space. The transparent fluid is chosen to be chemically inert to the material of the mount and optical member and to have a density supporting the optical member at substantially neutral buoyancy.

A mounting means for a hydrostatically-supported optical stabilizer is disclosed in the patent to W. E. Humphrey, U.S. Pat. No. 3,532,409 issued Oct. 6, 1970. The mounting includes a pin extending into the chamber having its point protruding into a small centering cone mounted on the back of the stabilizing mirror. The mirror is prevented from drifting away from its contact with the pin by the attraction between a ring magnet mounted on the outside of the casing and a ring magnet mounted on the mirror. This type of mounting means is very difficult to assemble due to the fact that many ambient conditions could upset the optical alignment maintained by the magnetic couple.

Still another prior art mount comprises a thin elastic member or thread passed through the optical member and attached to the front and rear of the cell. This type of mount functions when the elastic is stretched by hydrostatic forces operating in the cell.

SUMMARY OF THE INVENTION

The present invention relates to a mount for a stabilized optical element using a helical coil spring to apply stabilizing forces to the optical element. The coil spring is used in combination with a jewel mount having a pin engaged therewith. The spring can be adjusted to apply varying axial forces on the pin thereby increasing the force the pin exerts against the jewel mount or it may be positioned under a fixed tension. Increased tension or stretching of the spring also increases the spring's resistance to forces applied transversely of its longitudinal axis.

BRIEF DESCRIPTION OF THE DRAWING

The FIGURE is an exploded view of the optical stabilizer cell showing a mount in accordance with the invention.

DESCRIPTION OF THE PREFERRED EMBODIMENT

As shown in the drawing, the mount of this invention is illustrated assembled in a tubular, fluid filled cell 10 having a wall 12. A disk shaped transparent window 14 at right angles to the axis of the cell 10 closes off one end of the cell 10 and the wall 12 is internally threaded at its other end remote from the window 14. A plate assembly including a dished circular plate 16 having an externally threaded plate retainer 18 attached to it by spring loaded screws is adapted to be threadingly engaged with the internal threads of the wall 12 positioning the plate assembly as a wall to assist the window 14 and the wall 12 in defining the chamber of the cell 10. A pin support 20, having a terminal end from which a pin 22 extends, includes a tubular elongated shank portion 21 having an annular flange radially extending therefrom between the ends of the shank portion 21 and transversely of the shank portion. One terminal end of the shank portion is adapted to hold the pin 22 and the other end is externally threaded. The pin support 20 is engaged to the plate assembly by passing the threaded end of the shank through a central axial aperture, formed through the plate 16, until the flange bears against the dished or concave side of the plate 16 while the threaded end of the pin 22 extends beyond the other side of the plate 16, where it is engaged by a nut thereby securing the pin support 20 to plate 16.

A sapphire jewel bearing is mounted in the aperture of the mirror 24 by placing it in a cavity formed at the free end of an arm 26 which has a series of external circumferential threads and extends from an integral circular radially extending base 28. The arm 26 and the base 28 form the jewel mount. To hold the jewel mount in engagement with the mirror 24, a tubular jewel mount retainer 30 having internal threading and an outwardly extending flange 32 is screwed onto the arm 26 sandwiching the mirror between the base 28 and the flange 32. An axial through hole is formed in the tubular jewel mount retainer and a tubular continuation portion 36 having a spring engagement portion extends beyond the flange 32. A pull collar 38 circumscribes the pin support shank 21, is axially movable thereon, has a tubular extension 40 of smaller diameter than the remaining portion of the pull collar 38 and includes a set screw which can be threaded against the shank portion 21 fixing the pull collar 38 in relation to the shank portion. The tubular continuation portion 36 is attached to a first terminal end of a helical, extension spring 42 whose other terminal end is attached to the tubular extension 40 of the pull collar 38 circumscribing the same.

The shank portion 21 of the pin support 20 extends through the axial center of the pull collar 38, the spring 42 into the axial opening in the jewel mount retainer 30 placing the tip of the pin 22 into abutting relation with the jewel in the jewel mount retainer 30. The helical extension spring 42 can be adjusted in extension to vary the amount of force that the pin 22 exerts against the bearing and the amount of force needed to move the optical element a small angle transverse of the optical path of the optical instrument. The helical extension spring 42 is formed from music wire having a diameter of 0.005 and coils of 0.156 inch – 162 inch ID. The substrate of the mirror 24 is vitreous carbon.

A flexible gasket 44 is screwed onto the wall 12 of the cell 10 to act as a seal and as a diaphram adapted to flex to remove bubbles from the immersion fluid, and to allow for thermal expansion of the fluid.

At a predetermined temperature the mirror is neutrally buoyant in the immersion fluid. The tension on the spring 42 will apply a force to the mirror which will prevent it from being displaced from its chosen aligned position due to density change of the immersion fluid caused by temperature variations.

We claim:

1. An assembly for mounting an optical member buoyantly supported within a transparent fluid, the fluid being disposed within a chamber of a stabilizer cell, and the cell having at least one wall, comprising:

a mounting means extending from the stabilizer cell wall to an end terminating in the chamber;

a holder being connected to the optical member and having a pivot means associated therewith, the pivot means being engageable with the end of said mounting means terminating in the chamber;

a pull collar being moveable along and fixable to said mounting means; and an extendable coil spring under tension connecting the holder to the pull collar for applying a variable force from the pivot means against the end of said mounting means terminating in the chamber.

2. The assembly of claim 1 wherein the stabilizer cell has a window and the mounting means extends from the wall opposite the window.

3. An assembly for mounting an optical member buoyantly supported within a transparent fluid, the fluid being disposed within a chamber of a stabilizer cell with the cell having at least one wall, comprising:

a mounting means extending from the stabilizer cell wall and terminating as a pin in the chamber;

a holder being connected to the optical member and having a pivot means associated therewith, the pivot means being a jewel mount and operable with the pin of said mounting means for relatively friction free pivotal movement;

a pull collar being moveable along and fixable to said mounting means; and an extendable coil spring connecting the holder to the pull collar, whereby the jewel mount of the pivot means exerts a variable force against the pin of the mounting means.

* * * * *

UNITED STATES PATENT OFFICE
CERTIFICATE OF CORRECTION

Patent No. 3,848,960　　　　　Dated November 19, 1974

Inventor(s) Richard H. Burns et al

It is certified that error appears in the above-identified patent and that said Letters Patent are hereby corrected as shown below:

Col. 1, line 10, delete "anagle" after "small" and substitute therefor --angle--.

Col. 3, line 14, after the hyphen and before "162" insert --.--.

Signed and sealed this 14th day of January 1975.

(SEAL)
Attest:

McCOY M. GIBSON JR.　　　　　C. MARSHALL DANN
Attesting Officer　　　　　　Commissioner of Patents